(12) United States Patent
Takami et al.

(10) Patent No.: US 12,154,009 B2
(45) Date of Patent: Nov. 26, 2024

(54) INFORMATION PROCESSING APPARATUS FOR CONTROLLING FLIGHT OF AN AERIAL VEHICLE WITH A GENERATED LEARNING MODEL

(71) Applicant: NTT DOCOMO, INC., Tokyo (JP)

(72) Inventors: Tadao Takami, Tokyo (JP); Koji Ishii, Tokyo (JP); Jooin Woo, Tokyo (JP); Hiroshi Kawakami, Tokyo (JP); Kaori Niihata, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 806 days.

(21) Appl. No.: 17/283,166

(22) PCT Filed: Oct. 28, 2019

(86) PCT No.: PCT/JP2019/042194
§ 371 (c)(1),
(2) Date: Apr. 6, 2021

(87) PCT Pub. No.: WO2020/121665
PCT Pub. Date: Jun. 18, 2020

(65) Prior Publication Data
US 2022/0004922 A1 Jan. 6, 2022

(30) Foreign Application Priority Data
Dec. 14, 2018 (JP) .................. 2018-234332

(51) Int. Cl.
*G06N 20/00* (2019.01)
*G06V 20/59* (2022.01)
(52) U.S. Cl.
CPC ........... *G06N 20/00* (2019.01); *G06V 20/597* (2022.01)

(58) Field of Classification Search
CPC ............................ G06N 20/00; G06V 20/597
See application file for complete search history.

(56) References Cited

U.S. PATENT DOCUMENTS

2020/0335010 A1* 10/2020 Wang .................. G05D 1/0016

FOREIGN PATENT DOCUMENTS

JP 2010269724 A 12/2010

OTHER PUBLICATIONS

Imanberdiyev et al. "Autonomous Navigation of UAV by Using Real-Time Model-Based Reinforcement Learning", ICCARV, 2016, pp. 6.*
Ng et al. "Autonomous helicopter flight via Reinforcement Learning", ng-etal03.pdf (berkeley.edu), 2003, pp. 8.*
International Search Report issued in corresponding PCT Application No. PCT/JP2019/042194 dated Dec. 24, 2019.

* cited by examiner

*Primary Examiner* — Li Wu Chang
(74) *Attorney, Agent, or Firm* — DILWORTH IP, LLC

(57) ABSTRACT

A server device performs machine learning on the relationship between the content of piloting of an aerial vehicle and the behavior of the aerial vehicle in response to the content of the piloting, and generates a learning model for automatically piloting the aerial vehicle. However, the aerial vehicle is piloted in various environments and conditions, and there are environments and conditions that are unsuited for achieving highly accurate and stable automatic piloting. Therefore, the server device performs the machine learning only in an environment or a condition suited for realizing the automatic piloting.

8 Claims, 2 Drawing Sheets

INFORMATION PROCESSING APPARATUS FOR CONTROLLING FLIGHT OF AN AERIAL VEHICLE WITH A GENERATED LEARNING MODEL

TECHNICAL FIELD

The present invention relates to a technique for machine learning the piloting of an aerial vehicle.

BACKGROUND

Unmanned aerial vehicles called drones are becoming increasingly popular. For example, Japanese Patent Application Laid-Open No. 2010-269724 discloses a technique for achieving accurate landing of an unmanned aerial vehicle.

By performing machine learning on the relationship between the contents of piloting this type of aerial vehicle and the behavior of the aerial vehicle in response to the contents of the piloting, it becomes possible to achieve automatic piloting of the aerial vehicle by using a learning model obtained by the machine learning.

However, an aerial vehicle is piloted in various environments and under various conditions, so that it is desirable to perform machine learning in environments and conditions suited for accomplishing accurate and stable automatic piloting.

Accordingly, an object of the present invention is to perform learning on a relationship between the piloting of an aerial vehicle and the behavior of the aerial vehicle in response to the piloting by basing the learning on a relationship suited for the learning.

SUMMARY OF INVENTION

To this end, the present invention provides an information processing apparatus including: a learning unit that learns a relationship between piloting of an aerial vehicle and a behavior of the aerial vehicle in response to the piloting; and a determination unit that determines whether the flight of an aerial vehicle is a flight that satisfies a condition determined as being not for the learning, wherein the learning unit performs the learning with less weight given to the relationship between the piloting and the behavior of the aerial vehicle in a period in which it is determined that a flight satisfies the condition, as compared with a period in which it is determined that the flight does not satisfy the condition.

The flight that satisfies the condition is a low-visibility flight, in which the aerial vehicle flies in an environment in which the visibility of the aerial vehicle from an operator is lower than a predetermined level, and the determination unit may determine whether the flight of the aerial vehicle is the low-visibility flight, and the learning unit may perform the learning with less weight given to the relationship between the piloting and the behavior of the aerial vehicle in a period in which the flight is determined as being the low-visibility flight, as compared with a period in which the flight is determined as being not the low-visibility flight.

The flight that satisfies the condition is an anomaly-affected flight, in which the aerial vehicle flies with an anomaly occurring in the aerial vehicle. The determination unit may determine whether the flight of the aerial vehicle is the anomaly-affected flight, and the learning unit may perform the learning with less weight given to the relationship between the piloting and the behavior of the aerial vehicle in a period in which the flight is determined as being the anomaly-affected flight, as compared with a period in which the flight is determined as being not the anomaly-affected flight.

A flight that satisfies the condition is a signal-missing flight, in which the aerial vehicle flies with a missing radio signal for controlling the aerial vehicle. The determination unit may determine whether the flight of the aerial vehicle is the signal-missing flight, and the learning unit may perform the learning with less weight given to the relationship between the piloting and the behavior of the aerial vehicle in a period in which the flight is determined as being the signal-missing flight, as compared with a period in which the flight is determined as being not the signal-missing flight.

The learning unit may perform the learning with less weight given to the relationship between the piloting and the behavior of the aerial vehicle in a period in which the flight is determined as being a flight that satisfies the condition and further in a specific period in which the behavior of the aerial vehicle is excessively large or small in response to the piloting of the aerial vehicle, as compared with a period that is not the specific period.

The learning unit may perform the learning with less weight given to the relationship between the piloting and the behavior of the aerial vehicle in a period in which it is determined that the flight satisfies the condition and further in a specific period in which the behavior of the aerial vehicle differs from an expected behavior by a threshold value or more, as compared with a period that is not the specific period.

The threshold value may vary according to the piloting skill level of an operator.

The learning unit may perform the learning with less weight given to the relationship between the piloting and the behavior of the aerial vehicle in a period in which it is determined that the flight satisfies the condition and further in a specific period in which an external environment at the time of the flight of the aerial vehicle is a predetermined environment, as compared with a period that is not the specific period.

According to the present invention, in the case where a relationship between the piloting of an aerial vehicle and the behavior of the aerial vehicle in response to the piloting is learned, the learning can be performed on the basis of a relationship suited for the learning.

DETAILED DESCRIPTION

Configuration

Figure 1:
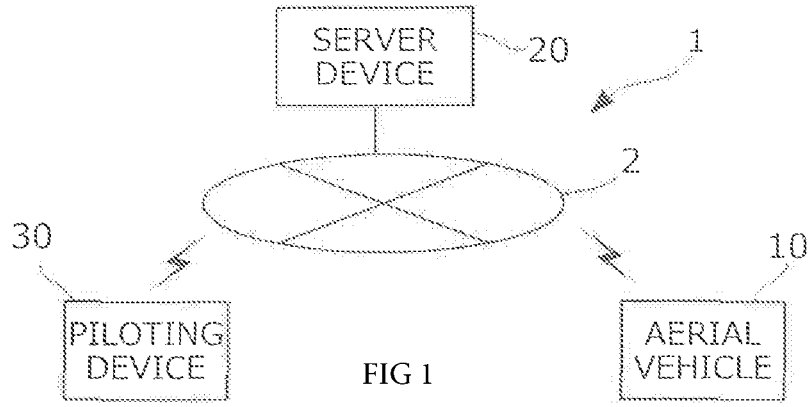
FIG. 1 is a diagram illustrating an example of the configuration of a flight system in accordance with the present invention.

FIG. 1 is a diagram illustrating an example of the configuration of a flight system 1. The flight system 1 includes an unmanned aerial vehicle 10 called, for example, a drone, a server device 20 which functions as an example of an information processing unit in accordance with the present invention, a piloting device 30 which functions as a remote controller for an operator to pilot the aerial vehicle 10, and a network 2 connecting these to make them communicable. The network 2 is a radio communication network, such as LTE (Long Term Evolution), and includes a radio base station or a higher-level device thereof, neither of which is illustrated.

The aerial vehicle 10 receives, through the network 2, a signal corresponding to a piloting operation performed by the operator using the piloting device 30, and controls its own flight according to the signal. In the present embodiment, an example will be described in which the aerial vehicle 10 is piloted using radio signals from the piloting device 30 through the network 2. Alternatively, however, the aerial vehicle 10 may be piloted using radio signals that directly reach the aerial vehicle 10 from the piloting device 30 without passing through the network 2.

The server device 20 performs machine learning on the relationship between the content of the piloting of the aerial vehicle 10 and the behavior of the aerial vehicle 10 in response to the content of the piloting, and generates a learning model for automatically piloting the aerial vehicle 10. However, the aerial vehicle 10 is piloted in various environments and conditions, and there are environments and conditions that are unsuited for achieving highly accurate and stable automatic piloting. Hence, the server device 20 performs the machine learning only in an environment and condition suited for realizing the automatic piloting.

Figure 2:
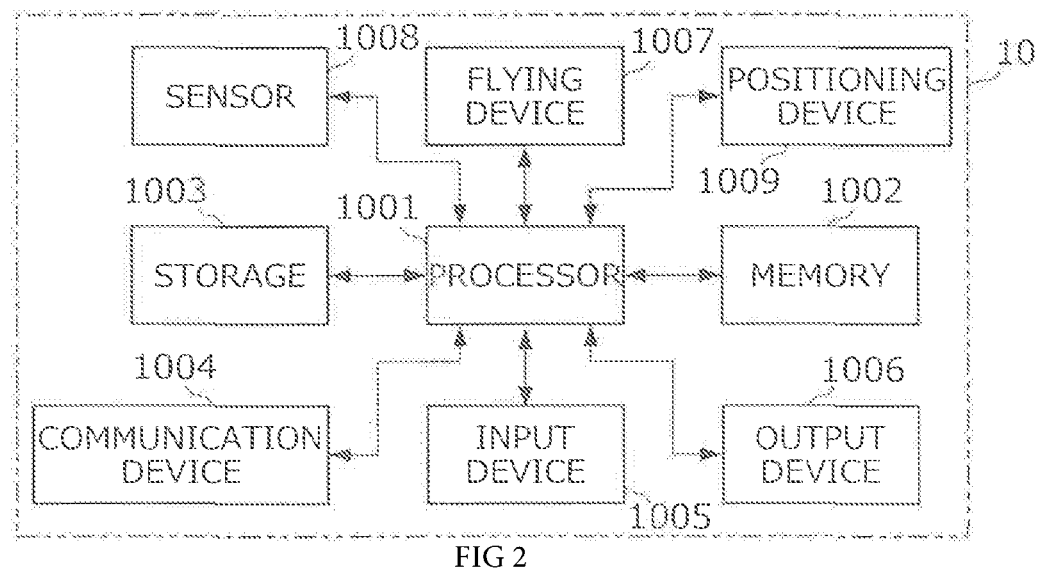
FIG. 2 is a diagram illustrating the hardware configuration of an aerial vehicle in accordance with the present invention.

FIG. 2 is a diagram illustrating the hardware configuration of the aerial vehicle 10. The aerial vehicle 10 is physically configured as a computer system that includes a processor 1001, a memory 1002, a storage 1003, a communication device 1004, an input device 1005, an output device 1006, a flying device 1007, a sensor 1008, a positioning device 1009, and a bus that connects these constituent elements. Each of these apparatuses operates with electric power supplied from a battery (not shown). In the following description, the term "apparatus" can be read as a circuit, a device, a unit, or the like. The hardware configuration of the aerial vehicle 10 may be formed to include one device or a plurality of devices illustrated in the drawing, or may be configured without including some devices.

The functions of the aerial vehicle 10 are performed by reading predetermined software (program) on hardware such as the processor 1001 and the memory 1002, so that the processor 1001 performs an operation, the communication is controlled by the communication device 1004, and at least one of reading and writing of data in the memory 1002 and the storage 1003 is controlled.

The processor 1001 controls, for example, the entire computer by operating an operating system. The processor 1001 may be composed of a central processing unit (CPU) that includes an interface with peripheral devices, a control unit, an arithmetic unit, a register, and the like. Further, for example, a baseband signal processing unit, a call processing unit, and the like may be implemented by the processor 1001.

The processor 1001 reads out a program (program code), a software module, data, and the like from at least one of the storage 1003 and the communication device 1004 to the memory 1002, and executes various types of processing according to these. As the program, a program that causes a computer to execute at least a part of the operations described below is used. The functional blocks of the aerial vehicle 10 may be implemented by a control program stored in the memory 1002 and run by the processor 1001. Various types of processing may be executed by one processor 1001, or may be executed simultaneously or sequentially by two or more processors 1001. The processor 1001 may be implemented by one or more chips. The program may be transmitted from the network 2 to the aerial vehicle 10 through a telecommunication line.

The memory 1002 is a computer-readable recording medium, and may be composed of at least one of, for example, a ROM (Read Only Memory), an EPROM (Erasable Programmable ROM), an EEPROM (Electrically Erasable Programmable ROM), and a RAM (Random Access Memory). The memory 1002 may be called a register, a cache, a main memory (main storage device), or the like. The memory 1002 can store a program (program code), a software module, and the like that can be executed to perform a method according to the present embodiment.

The storage 1003 is a computer-readable recording medium, and may be composed of at least one of, for example, an optical disk, such as a CD-ROM (Compact Disc ROM), a hard disk drive, a flexible disk, and a magneto-optical disk (e.g. a compact disk, a digital versatile disk, a Blu-ray (registered trademark) disk), a smart card, a flash memory (e.g. a card, a stick, a key drive), a floppy (registered trademark) disk, a magnetic strip, or the like. The storage 1003 may be called an auxiliary storage device. The storage 1003 stores, for example, the identification information of the aerial vehicle 10 (referred to as aerial vehicle identification information).

The communication device 1004 is hardware (a transmission/reception device) for performing communication between computers through at least one of a wired network and a wireless network, and is also referred to as, for example, a network device, a network controller, a network card, a communication module, or the like.

The input device 1005 is an input device that receives inputs from outside (e.g. a keyboard, a mouse, a microphone, a switch, a button, a sensor, a joystick, a ball controller, and the like). The output device 1006 is an output device that performs output to outside (e.g. a display, a speaker, an LED lamp, and the like). The input device 1005 and the output device 1006 may have an integrated configuration (e.g. a touch panel).

The flying device 1007 is a mechanism for flying the aerial vehicle 10 in the air, and includes, for example, a propeller, and a motor and a drive mechanism for driving the propeller.

The sensor 1008 detects, for example, the condition of the aerial vehicle 10. The sensor 1008 includes a sensor group of, for example, a temperature sensor, a rotation speed sensor that detects the rotation speed of a motor, a sensor that detects a value related to certain input/output such as current/voltage (e.g. a remaining power sensor of a battery), a gyro sensor, an acceleration sensor, an atmospheric pressure (altitude) sensor, a magnetic (azimuth) sensor, and an ultrasonic sensor.

The positioning device 1009 measures the three-dimensional position of the aerial vehicle 10. The positioning device 1009 is, for example, a GPS (Global Positioning System) receiver, and measures the position of the aerial vehicle 10 on the basis of the GPS signals received from a plurality of satellites.

In the present embodiment, the behavior of the aerial vehicle 10 is identified by the sensor 1008 and the positioning device 1009 described above.

The devices, such as the processor 1001 and the memory 1002, are connected by a bus for communicating information. The bus may be configured using a single bus, or may be configured using a different bus for each device.

The aerial vehicle 10 may be configured by including hardware such as a microprocessor, a digital signal processor (DSP), an ASIC (Application Specific Integrated Circuit), a PLD (Programmable Logic Device), and an FPGA (Field Programmable Gate Array). Alternatively, some or all of the functional blocks may be implemented by the hardware. For example, the processor 1001 may be implemented using at least one of these pieces of hardware.

Figure 3:
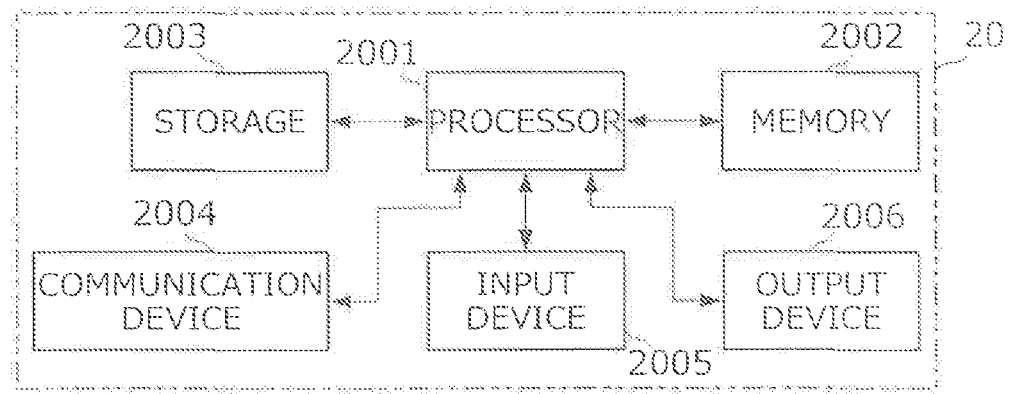
FIG. 3 is a diagram illustrating the hardware configuration of a server device in accordance with the present invention.

FIG. 3 is a diagram illustrating the hardware configuration of the server device 20. The server device 20 is physically configured as a computer device that mainly includes the processor 2001, the memory 2002, the storage 2003, the communication device 2004, the input device 2005, the output device 2006, and a bus connecting these constituent elements. The functions of the server device 20 are performed by reading predetermined software (program) onto hardware such as the processor 2001 and the memory 2002, so that the processor 2001 carries out calculation, communication is controlled by the communication device 2004, and at least one of the reading and writing of data in the memory 2002 and the storage 2003 is controlled. The processor 2001, the memory 2002, the storage 2003, the communication device 2004, the input device 2005, the output device 2006, and the bus connecting these are the same, as hardware, as the processor 1001, the memory 1002, the storage 1003, the communication device 1004, the input device 1005, the output device 1006, and the bus connecting these described in relation to the aerial vehicle 10, and therefore, the descriptions thereof will be omitted.

Figure 4:
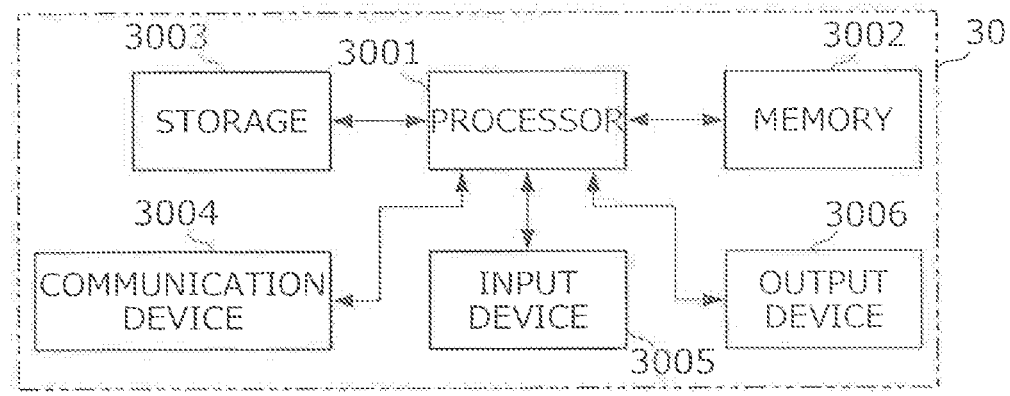
FIG. 4 is a diagram illustrating the hardware configuration of a piloting device in accordance with the present invention.

FIG. 4 is a diagram illustrating the hardware configuration of the piloting device 30. The piloting device 30 is physically configured as a computer device that mainly includes a processor 3001, a memory 3002, a storage 3003, a communication device 3004, an input device 3005, an output device 3006, and a bus connecting these. The functions in the piloting device 30 are performed by reading predetermined software (program) onto hardware such as the processor 3001 and the memory 3002, so that the processor 3001 carries out calculation, communication is controlled by the communication device 3004, and at least one of the reading and writing of data in the memory 3002 and the storage 3003 is controlled. The processor 3001, the memory 3002, the storage 3003, the communication device 3004, the input device 3005, the output device 3006, and the bus connecting these are similar, as hardware, to the processor 1001, the memory 1002, the storage 1003, the communication device 1004, the input device 1005, the output device 1006, and the bus connecting these described in relation to the aerial vehicle 10, and therefore, the descriptions thereof will be omitted.

Figure 5:
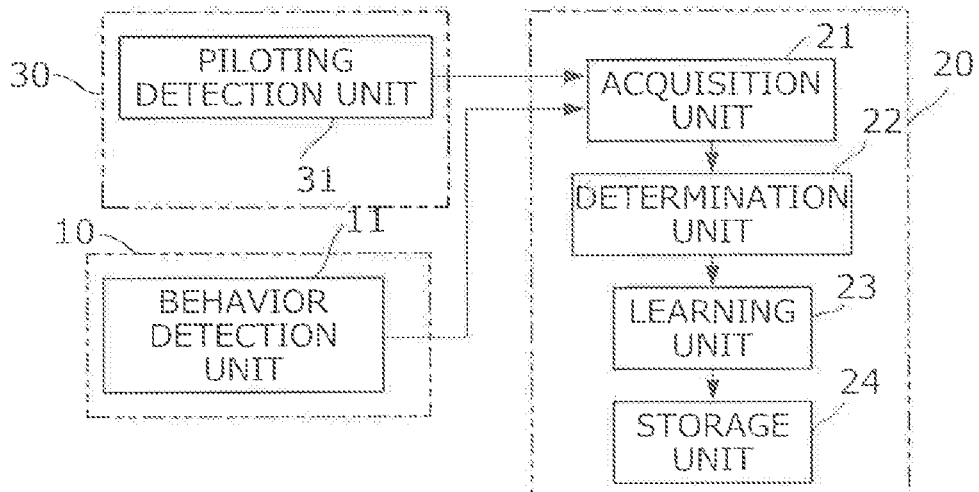
FIG. 5 is a diagram illustrating an example of the functional configuration of the flight system in accordance with the present invention.

FIG. 5 is a diagram illustrating an example of the functional configuration of the flight system 1. In the piloting device 30, a piloting detection unit 31 detects the content input to the input device 3005 by an operator, i.e. the content of the piloting, generates information indicating the result of the detection (referred to as the piloting information), and transmits the generated information to the server device 20 through the network 2. The piloting information includes a time stamp indicating the current date and time and the aerial vehicle identification information of the aerial vehicle 10 to be piloted, as well as piloting contents such as the type, amount, and direction of the piloting. The aerial vehicle identification information of the aerial vehicle 10 to be piloted is, for example, input to the piloting device 30 by the operator or the like before the piloting of the aerial vehicle 10 is started.

In the aerial vehicle 10, a behavior detection unit 11 detects the behavior of the aerial vehicle 10, generates information indicating the result of the detection (referred to as the behavior information), and transmits the generated information to the server device 20 through the network 2. The behavior information includes the time stamp indicating the current date and time and the aerial vehicle identification information stored in the storage 1003 of the aerial vehicle 10, as well as the information indicating the behavior of the aerial vehicle 10 that can be identified by the sensor 1008 and the positioning device 1009, such as the position (including the latitude, the longitude, and the altitude), the flight direction, the flight speed, and the flight acceleration of the aerial vehicle 10. The time stamp generated by the piloting detection unit 31 and the time stamp generated by the behavior detection unit 11 are synchronized in clocking processing. From these time stamps, the correspondence between the piloting information and the behavior information, that is, how the aerial vehicle 10 has behaved in response to the piloting by the operator can be identified. More specifically, if a time stamp included in the behavior information exists in a period corresponding to immediately after the time stamp included in the piloting information, then it means that the aerial vehicle 10 has behaved as indicated by the behavior information according to the piloting information.

In the server device 20, an acquisition unit 21 acquires, through the network 2, the piloting information and the behavior information generated by the piloting detection unit 31 and the behavior detection unit 11, respectively.

In the server device 20, a determination unit 22 determines whether the flight of the aerial vehicle 10 is a flight that satisfies the condition determined as being not for machine learning. Here, the flight that satisfies the condition determined as being not for machine learning is, for example, a flight in an environment where the visibility of the aerial vehicle 10 from the operator is lower than a predetermined level (hereinafter, referred to as the low-visibility flight). When piloting the aerial vehicle 10, there is a case where the operator carries out piloting while directly observing the appearance of the aerial vehicle 10 (referred to as "visual piloting"), and there is another case where the operator does not directly observe the appearance of the aerial vehicle 10, but visually recognizes a captured image taken by, for example, a camera mounted on the aerial vehicle 10 displayed on the piloting device 30, thereby to pilot the aerial vehicle 10 (referred to as non-visual piloting). The non-visual piloting exhibits lower visual recognition of the aerial vehicle 10 from the operator than the visual piloting. This is considered, therefore, to result in degradation in terms of piloting skill, piloting efficiency or flight stability even when the same operator performs the piloting. Hence, it can be said that such non-visual piloting is piloting which is unsuited for achieving highly accurate and stable automatic piloting by machine learning.

In the server device 20, a learning unit 23 performs machine learning on the relationship between the content of piloting of the aerial vehicle 10 and the behavior of the aerial vehicle 10 in response to the content of piloting, and generates a learning model. At this time, the learning unit 23 performs machine learning with less weight given to the relationship between the content of piloting and the behavior of the aerial vehicle 10 in a period in which it is determined that the flight satisfies the condition determined as being not for the machine learning described above, as compared with a period in which it is determined that the flight does not satisfy the condition. More specifically, the learning unit 23 performs machine learning with less weight given to the relationship between the content of piloting and the behavior of the aerial vehicle 10 in a period in which the flight is determined as being the low-visibility flight, as compared with a period in which the flight is determined as being not the low-visibility flight. With this arrangement, the relationship between the piloting and the behavior of the aerial vehicle 10 in the low-visibility flight has less importance in the learning model than the relationship between the piloting and the behavior of the aerial vehicle 10 in a flight that is not the low-visibility flight.

In the server device 20, a storage unit 24 stores the learning model generated by the learning unit 23. The learning model is used for performing, for example, the automatic piloting of the aerial vehicle 10 through the network 2.

Operation

A description will now be given of the operation of the server device 20. In the following description, when the server device 20 is described as the principal of processing, it specifically means that predetermined software (program) is read onto hardware, such as the processor 2001 and the memory 2002, so that the processor 2001 performs calculation, communication is performed by the communication device 2004, and the reading and/or writing of data in the memory 2002 and the storage 2003 is controlled, thereby executing the processing. The same applies to the aerial vehicle 10 and the piloting device 30.

Figure 6:
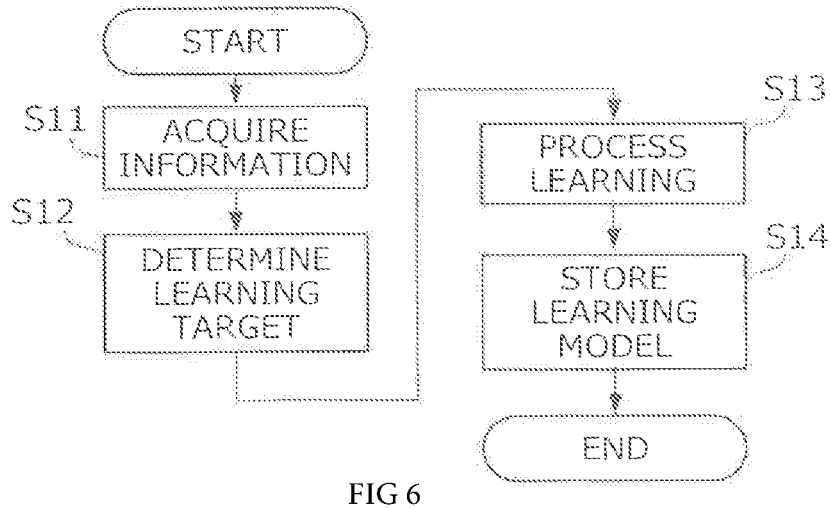
FIG. 6 is a flowchart illustrating an example of the operation of the server device in accordance with the present invention.

In FIG. 6, the acquisition unit 21 of the server device 20 acquires, through the network 2, the piloting information generated by the piloting detection unit 31 of the piloting device 30 and the behavior information generated by the behavior detection unit 11 of the aerial vehicle 10 (step S11). At this time, the acquisition unit 21 does not have to acquire the piloting information generated by the piloting detection unit 31 and the behavior information generated by the behavior detection unit 11 at the same timing, and may acquire the information at different timings. Further, the acquisition unit 21 may or may not acquire the piloting information generated by the piloting detection unit 31 each time the piloting information is generated. Similarly, the acquisition unit 21 may or may not acquire the behavior information generated by the behavior detection unit 11 each time the behavior information is generated. Further, the acquisition unit 21 may acquire the piloting information generated by the piloting detection unit 31 and the behavior information generated by the behavior detection unit 11 by requesting such information at any timing. Then, the acquisition unit 21 selects, from among a plurality of the acquired pieces of piloting information and behavior information, the piloting information and the behavior information that include the same aerial vehicle identification information and time stamp groups that are close to each other, and stores the selected information as an information group related to one flight by one set of the piloting device 30 and the aerial vehicle 10. The time stamp groups that are close to each other refer to time stamp groups in which the time interval between a certain time stamp and a time stamp that is temporally closest is within a threshold value.

Based on the piloting information and the behavior information included in the information group related to one flight by a certain set of the piloting device 30 and the aerial vehicle 10, the determination unit 22 of the server device 20 determines whether the flight includes the low-visibility flight (step S12). More specifically, if the distance between the aerial vehicle 10 and the piloting device 30 is equal to or more than a threshold value, then the determination unit 22 determines that the flight is the low-visibility flight, or if the distance between the aerial vehicle 10 and the piloting device 30 is below the threshold value, then the determination unit 22 determines that the flight is not the low-visibility flight.

The position of the aerial vehicle 10 can be identified by a position included in the behavior information. The position of the piloting device 30 can be identified by, for example, a positioning method based on the reception field intensity when the piloting device 30 receives a radio signal from a radio base station of the network 2 existing around the piloting device 30 (a method referred to as the so-called base station positioning). In the case where the piloting device 30 includes a positioning device such as a GPS, the position obtained by the positioning device may be included in the piloting information and transmitted to the server device 20. By such a determination, in the information group regarding one flight by the certain one set of the piloting device 30 and the aerial vehicle 10, the piloting information and the behavior information included in the period in which the low-visibility flight is performed, and the piloting information and the behavior information included in the period in which the low-visibility flight is not performed will be discriminated.

Next, the learning unit 23 of the server device 20 performs machine learning on the relationship between the content of the piloting of the aerial vehicle 10 and the behavior of the aerial vehicle 10 according to the content of the piloting (step S13). Specifically, the learning unit 23 performs machine learning that uses a regression analysis method. According to the method, from corresponding pilot information and behavior information, behavior information is used as an explanatory variable, and piloting information is used as a target variable, thereby to generate a learning model for identifying the content of the piloting for obtaining an arbitrary behavior. At this time, regarding the piloting information and the behavior information included in the period in which the flight is determined as being the low-visibility flight, the learning unit 23 performs the machine learning with less weight (contribution rate) given to the relationship between the piloting information and the behavior information, as compared with the piloting information and the behavior information included in a period in which the flight is determined as being not the low-visibility flight.

As a method for reducing the weight at that time, the following example can be considered. For example, the learning unit 23 may reduce the number of pieces of information used for the machine learning among the piloting information and the behavior information included in the period in which the flight is determined as being the low-visibility flight such that this number of pieces of information is smaller than the number of pieces of information used for machine learning among the piloting information and the behavior information included in the period in which the flight is determined as being not the low-visibility flight. In this case, the following example is considered. For example, the learning unit 23 limits the piloting information and the behavior information included in the period in which the flight is determined as being a low-visibility flight to a certain type of information as the information to be used for machine learning, or uses only a number of pieces of information equivalent to a predetermined ratio of the total number of pieces of information (a ratio below 100 when the total number of pieces of information is 100) for machine learning. Further, the learning unit 23 may not perform machine learning on the piloting information and the behavior information included in the period in which the flight is determined as being the low-visibility flight, that is, the learning unit 23 may set the weight for the relationship between the piloting information and the behavior information to zero. In this case, the learning unit 23 will perform machine learning based only on the piloting information and the behavior information included in the period in which the flight is determined as being not the low-visibility flight.

Next, the storage unit 24 of the server device 20 stores the learning model generated by the learning unit 23 (Step S14). This learning model is used, for example, to automatically pilot the aerial vehicle 10 through the network 2. More specifically, by inputting information that indicates an arbitrary behavior to the learning model, the information that indicates the content of the piloting for obtaining the behavior can be obtained.

According to the embodiment described above, when machine learning is performed on the relationship between the content of piloting of the aerial vehicle 10 and the behavior of the aerial vehicle 10 in response to the content of the piloting, a relationship suited for the machine learning can be extracted to perform the machine learning.

MODIFICATION EXAMPLES

The present invention is not limited to the embodiment described above. The foregoing embodiment may be modified as follows. Further, two or more of the following modification examples may be combined and implemented.

Modification Example 1

In the embodiment, the determination unit 22 determines whether the flight is the low-visibility flight on the basis of the distance between the aerial vehicle 10 and the piloting device 30; however, the determination method is not limited to the example of the embodiment. For example, the determination unit 22 may refer to the positions of the aerial vehicle 10 and the piloting device 30 and a map database that covers various facilities and terrain, and may determine that the flight is the low-visibility flight if there is an obstacle having a height equal to or more than a threshold value between the aerial vehicle 10 and the piloting device 30, or may determine that the flight is not the low-visibility flight if there is no such obstacle. When an operator performs low-visibility flight such as non-visual piloting, the operator himself or herself may perform an explicit operation using the piloting device 30, and the determination unit 22 may acquire information of whether the operator is performing the operation from the piloting device 30 through the network 2 so as to determine whether the flight is the low-visibility flight. Further, when the operator performs the low-visibility flight such as the non-visual piloting, the piloting device 30 may actuate a camera for the non-visual piloting, and the determination unit 22 may acquire information of whether the camera has been actuated from the piloting device 30 through the network 2 thereby to determine whether the flight is the low-visibility flight.

Modification Example 2

In the embodiment, in order to identify how the aerial vehicle 10 has behaved in response to the piloting by the operator, the temporal proximity relationship between the time stamp included in the piloting information and the time stamp included in the behavior information has been referred to; however, the method for the identification is not limited to this example. For example, each time the piloting is performed in the piloting device 30, a piloting identifier for identifying the piloting operation is issued and included in the piloting information to be transmitted to the server device 20, while at the same time, the piloting identifier is included in a flight control instruction for the aerial vehicle 10 sent from the piloting device 30. The aerial vehicle 10 is adapted to include the piloting identifier and the behavior information when the flight control is conducted according to the piloting identifier in the history of processing for its own flight control. Then, the behavior detection unit 11 of the aerial vehicle 10 transmits the behavior information including the piloting identifier to the server device 20. This enables the server device 20 to identify how the aerial vehicle 10 has behaved in response to the piloting by the operator.

Modification Example 3

Flights unsuited for machine learning are considered to include various flights in addition to the flight by the non-visual piloting described in the embodiment. For example, the low-visibility flight may include a flight in which the light quantity in a flight space is below a threshold value (e.g. at night, a heavily rainy state, or a cloudy state). In this case, a determination unit 12 may determine whether the flight space of the aerial vehicle 10 is during nighttime on the basis of the current time identified by a timer, which is not illustrated, or a light quantity identified by a light quantity sensor, which is not illustrated. Further, the determination unit 12 may determine whether the flight space of the aerial vehicle 10 is having a heavy rain or is cloudy on the basis of the light quantity identified by the light quantity sensor, which is not illustrated, or the information provided from a meteorological database, which is not illustrated.

Modification Example 4

Flights unsuited for machine learning may include a flight when an anomaly occurs in the aerial vehicle 10 (referred to as an anomaly-affected flight). It is considered that the behavior of the aerial vehicle 10 may not follow piloting as intended in the anomaly-affected flight, as compared with a flight when no anomaly is occurring in the aerial vehicle 10. Therefore, the piloting when such an anomaly-affected flight is performed can be said to be piloting that is unsuited to achieve highly accurate and stable automatic piloting by machine learning. For this reason, if the occurrence of any anomaly is detected by the sensor 1008, the aerial vehicle 10 includes the content of the anomaly in the behavior information and transmits the behavior information to the server device 20. The determination unit 12 of the server device 20 determines whether the flight is an anomaly-affected flight according to the content of the anomaly included in the behavior information. A learning unit 13 performs machine learning with less weight given to the relationship between the content of the piloting and the behavior of the aerial vehicle 10 in a period in which the flight is determined as being the anomaly-affected flight, as compared with a period in which the flight is determined as being not the anomaly-affected flight.

Modification Example 5

Flights unsuited for machine learning may include a flight in which the degree of missing radio signals for the flight control of the aerial vehicle 10 from the piloting device 30 is equal to or more than a threshold value (referred to as the signal-missing flight). The signal-missing flight can occur when the radio communication environment in the piloting device 30 or the aerial vehicle 10 worsens. It is considered that the behavior of the aerial vehicle 10 may not follow piloting as intended in the signal-missing flight, as compared with a flight in which the degree of missing the radio signals for the flight control of the aerial vehicle 10 from the piloting device 30 is below the threshold value. Therefore, the piloting when such a signal-missing flight is performed can be said to be piloting that is unsuited to achieve highly accurate and stable automatic piloting by machine learning. For this reason, if the degree of missing radio signals reaches the threshold value or more, then the piloting device 30 or the aerial vehicle 10 includes the degree of missing in the piloting information or the behavior information by using a known technique and transmits the piloting information or the behavior information to the server device 20. The determination unit 12 of the server device 20 determines whether the flight is the signal-missing flight according to the degree of missing. The learning unit 13 performs machine learning with less weight given to the relationship between the content of the piloting and the behavior of the aerial vehicle 10 in a period in which the flight is determined as being the signal-missing flight, as compared with a period in which the flight is determined as being not the signal-missing flight.

Modification Example 6

More conditions that are unsuited for machine learning may be added to the low-visibility flight, the anomaly-affected flight, or the signal-missing flight described above. For example, a case where a gust blows onto the aerial vehicle 10 and the aerial vehicle 10 takes a sudden unintended behavior may be added as a condition that is unsuited for machine learning. The behavior of the aerial vehicle 10 when affected by an external environment other than piloting, such as a gust, becomes less related to the piloting of the operator. Hence, the relationship between piloting and behavior at that time is considered as being even more unsuited for machine learning than the relationship between piloting and behavior in the low-visibility flight, the anomaly-affected flight, or the signal-missing flight. For this reason, in a period in which the flight is determined as being the low-visibility flight, the anomaly-affected flight, or the signal-missing flight, the determination unit 12 determines whether the behavior of the aerial vehicle 10 deviates by a threshold value or more from a behavior expected in response to the piloting performed on the aerial vehicle 10, i.e., whether the behavior of the aerial vehicle 10 is excessively large or small in response to the piloting performed on the aerial vehicle 10. In such a period in which the behavior of the aerial vehicle 10 becomes excessively large or small in response to the piloting (referred to as the specific period), the learning unit 13 performs machine learning with less weight given to the relationship between the content of piloting and the behavior of the aerial vehicle 10, as compared with a period that is not the specific period.

Modification 7

In modification example 5 described above, it has been determined whether the behavior of the aerial vehicle 10 is excessively large or small in response to the piloting in order to identify the case where a gust blows onto the aerial vehicle 10, causing the aerial vehicle 10 to take a sudden unintended behavior. Alternatively, the determination may be performed as follows. If the flight schedule of the aerial vehicle 10 is set beforehand and the future behavior of the aerial vehicle 10 can be identified with accuracy of a certain level or more, then the determination unit 12 may determine, as the specific period, a period in which the behavior of the aerial vehicle 10 differs from an expected behavior by a threshold value or more. In this case, the learning unit 13 performs machine learning with less weight given to the relationship between the content of piloting and the behavior of the aerial vehicle 10 in such a specific period, in which the behavior of the aerial vehicle 10 differs from an expected behavior by a threshold value or more, as compared with a non-specific period.

The threshold value used in determining, as the specific period, the period in which the behavior of the aerial vehicle 10 differs from an expected behavior as described above, may be made variable according to a predetermined condition. For example, the threshold value may be changed according to the piloting skill level of an operator. The piloting skill level of the operator may be input to the piloting device 30 by an operator or the like to notify the server device 20 of the piloting skill level of the operator, or the server device 20 may keep in advance the piloting skill level of each operator in the form of a database. In a conceivable example, a high piloting skill level, i.e., superior piloting, is considered to indicate piloting suited for learning, so that the foregoing threshold value is increased to expand a learning target, whereas a low piloting skill level, i.e., poor piloting, is considered to indicate piloting unsuited for learning, so that the foregoing threshold value is decreased.

Modification Example 8

As conditions that are even more unsuited for machine learning than the low-visibility flight, the anomaly-affected flight, or the signal-missing flight described above, conditions related to an external environment during a flight may be used, the external environment being an environment where a strong wind is constantly blowing, a rainy environment, a snowy environment, or the like. The behavior when the aerial vehicle 10 is affected by an external environment, such as a strong wind, a rainfall, a snowfall, or the like is less related to the piloting by an operator, so that the relationship between the piloting and the behavior at that time is considered even more unsuited for machine learning than the relationship between the piloting and the behavior in the low-visibility flight, the anomaly-affected flight, or the signal-missing flight. In this case, the determination unit 12 further determines whether the external environment of the aerial vehicle 10 during the flight is a predetermined environment in the period in which the flight has been determined as being the low-visibility flight, the anomaly-affected flight, or the signal-missing flight. The external environment at that time is identified on the basis of information acquired by the server device 20 from a meteorological database, which is not illustrated, an anemometer, a rainfall/snowfall detector, or the like. The learning unit 13 performs machine learning with less weight given to the relationship between the content of piloting and the behavior of the aerial vehicle 10 in the period in which the flight is determined as being the low-visibility flight, the anomaly-affected flight, or the signal missing flight and also in which the external environment during the flight of the aerial vehicle 10 is a predetermined environment (referred to as the specific period), as compared with a period that is not the specific period.

Modification Example 9

The function of the server device 20 (information processing device) may be distributed and provided by a plurality of devices. Further, the aerial vehicle 10 or the piloting device 30 may replace at least a part of the function of the server device 20 (information processing device). In the foregoing embodiment, the method for measuring the position of the aerial vehicle 10 is not limited to the method using the GPS. The position of the aerial vehicle 10 may be measured by a method not using the GPS.

OTHER MODIFICATION EXAMPLES

The block diagrams used in the description of the foregoing embodiment illustrate blocks in functional units. These functional blocks (components) are implemented by a random combination of at least one of hardware and software. Further, a method of implementing each functional block is not particularly limited. More specifically, each functional block may be implemented using one device physically or logically coupled, or directly or indirectly connecting (for example, wired or wireless) two or more devices that are physically or logically separated from each other, and may be implemented using the plurality of devices. The functional block may be implemented by combining software with one device or the plurality of devices mentioned above.

The functions include but are not limited to: judgment, decision, determination, computation, calculation, processing, derivation, investigation, search, confirmation, reception, transmission, output, access, resolution, selection, appointment, establishment, comparison, assumption, expectation, deeming, broadcasting, notifying, communicating, forwarding, configuring, reconfiguring, allocating, mapping, and assigning. For example, a functional block (configuration unit) that causes transmission to function is called a transmitting unit or a transmitter. In any case, as described above, the implementation method is not particularly limited.

For example, a server, a client, or the like in an embodiment of the present disclosure may function as a computer that performs the processing of the present disclosure.

Each mode/embodiment described in the present disclosure may be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other appropriate systems, and next generation systems extended based thereon. Further, a plurality of systems may be combined (for example, a combination of at least one of LTE and LTE-A with 5G) and applied.

The processing procedure, sequence, flowchart, and the like of each mode/embodiment described in the present disclosure may be reordered as long as there is no contradiction. For example, regarding the methods described in the present disclosure, elements of various steps are presented in an exemplary order, and are not limited to any specific order presented.

Input and output information and the like may be stored in a specific place (e.g. a memory) or may be managed using a management table. Information and the like that is input and output can be overwritten, updated, or added. Output information and the like may be deleted. Input information and the like may be transmitted to another device.

Determination may be made on the basis of a value represented by 1 bit (0 or 1), a Boolean value (Boolean: true or false), or the comparison of numerical values (e.g. the comparison with a predetermined value).

Each mode/embodiment described in the present disclosure may be used alone or in combination, or may be switched and used in the course of implementation. Further, the notification of predetermined information (e.g. the notification of "being X") is not limited to being explicitly performed, and may alternatively be performed implicitly (e.g. not performing the notification of the predetermined information).

Although the present disclosure has been described in detail above, it is obvious to those skilled in the art that the present disclosure is not limited to the embodiments described in the present disclosure. The present disclosure can be implemented as modified and changed modes without departing from the spirit and scope of the present disclosure defined by the description of the claims. Therefore, the description of the present disclosure is intended for illustrative purposes, and has no restrictive meaning for the present disclosure.

Software, regardless of whether it is called software, firmware, middleware, microcode, a hardware description language, or any other name, should be broadly interpreted to mean instructions, instruction sets, codes, code segments, program codes, programs, subprograms, software modules, applications, software applications, software packages, routines, subroutines, objects, executables, threads of execution, procedures, functions, and the like.

Further, software, instructions, information, and the like may be transmitted and received through a transmission medium. For example, if software is transmitted from a website, a server, or other remote source by using at least one of wired technology (a coaxial cable, a fiber optic cable, a twisted pair, a digital subscriber line (DSL), and the like) and wireless technology (infrared, microwave, and the like), then at least one of these wired and wireless technologies is included in the definition of a transmission medium.

The information, signals, and the like described in the present disclosure may be represented using any of a variety of different technologies. For example, data, instructions, commands, information, signals, bits, symbols, chips, and the like that can be referred to throughout the above description may be represented by voltages, currents, electromagnetic waves, magnetic fields or magnetic particles, optical fields or photons, or any combination of these.

Further, the information, the parameters, and the like described in the present disclosure may be represented using absolute values, may be represented using relative values from predetermined values, or may be represented using another corresponding information.

The phrase "on the basis of" used in the present disclosure does not mean "only on the basis of" unless otherwise specified. In other words, the phrase "on the basis of" means both "only on the basis of" and "at least on the basis of."

In the present disclosure, in the case where articles are added in translation, such as a, an, and the in English, the present disclosure may include a case where nouns following these articles are plural.

In the present disclosure, the term "A and B are different" may mean "A and B are different from each other." The term may also mean that "each of A and B is different from C." Terms such as "separate," "coupled," and the like may be interpreted as with "different".

DESCRIPTION OF REFERENCE NUMERALS

1: flight system
10: aerial vehicle
11: behavior detection unit
1001: processor
1002: memory
1003: storage
1004: communication device
1005: input device
1006: output device
1007: flying device
1008: sensor
1009: positioning device
20: server device
21: acquisition unit
22: determination unit
23: learning unit
24: storage unit
2001: processor
2002: memory
2003: storage
2004: communication device
2005: input device
2006: output device
30: piloting device
31: piloting detection unit
3001: processor
3002: memory
3003: storage
3004: communication device
3005: input device
3006: output device.

The invention claimed is:

1. An information processing apparatus comprising:
a processor configured to:
learn a relationship between piloting of an aerial vehicle and a behavior of the aerial vehicle in response to the piloting;
determine whether a flight of the aerial vehicle is a flight that satisfies a condition determined as being not for the learning;
perform the learning to generate a learning model with less weight given to a relationship between the piloting and the behavior of the aerial vehicle in a period in which it is determined that the flight satisfies the condition, as compared with a period in which it is determined that the flight does not satisfy the condition;
wherein a flight that satisfies the condition is a low-visibility flight, in which the aerial vehicle flies in an environment in which the visibility of the aerial vehicle from an operator is lower than a predetermined level; and
wherein the processor is further configured to:
determine whether a flight of an aerial vehicle is the low-visibility flight;
perform the learning to generate the learning model with less weight given to a relationship between the piloting and the behavior of the aerial vehicle in a period in which a flight is determined as being the low-visibility flight, as compared with a period in which a flight is determined as being not the low-visibility flight; and
control the flight of the aerial vehicle with the generated learning model.

2. An information processing apparatus comprising:
a processor configured to:
learn a relationship between piloting of an aerial vehicle and a behavior of the aerial vehicle in response to the piloting;
determine whether a flight of the aerial vehicle is a flight that satisfies a condition determined as being not for the learning;
perform the learning to generate a learning model with less weight given to a relationship between the piloting and the behavior of the aerial vehicle in a period in which it is determined that the flight satisfies the condition, as compared with a period in which it is determined that the flight does not satisfy the condition;
wherein a flight that satisfies the condition is an anomaly-affected flight, in which the aerial vehicle flies with an anomaly occurring in the aerial vehicle; and
wherein the processor is further configured to:
determine whether the flight of the aerial vehicle is the anomaly-affected flight;
perform the learning to generate the learning model with less weight given to a relationship between the piloting and the behavior of the aerial vehicle in a period in which the flight is determined as being the anomaly-affected flight, as compared with a period in which the flight is determined as being not the anomaly-affected flight; and
control the flight of the aerial vehicle with the generated learning model.

3. An information processing apparatus comprising:
a processor configured to:
learn a relationship between piloting of an aerial vehicle and a behavior of the aerial vehicle in response to the piloting;
determine whether a flight of the aerial vehicle is a flight that satisfies a condition determined as being not for the learning;
perform the learning to generate a learning model with less weight given to a relationship between the piloting and the behavior of the aerial vehicle in a period in which it is determined that the flight satisfies the condition, as compared with a period in which it is determined that the flight does not satisfy the condition;
wherein a flight that satisfies the condition is a signal-missing flight, in which the aerial vehicle flies with a missing radio signal for controlling the aerial vehicle; and
wherein the processor is further configured to:
determine whether the flight of the aerial vehicle is the signal-missing flight; and
perform the learning to generate the learning model with less weight given to a relationship between the piloting and the behavior of the aerial vehicle in the period in which the flight is determined as being the signal-missing flight, as compared with a period in which the flight is determined as being not the signal-missing flight; and
control the flight of the aerial vehicle with the generated learning model.

4. The information processing apparatus according to claim 1,
 wherein the processor is further configured to perform the learning to generate the learning model with less weight given to a relationship between the piloting and the behavior of the aerial vehicle in a period in which it is determined that the flight satisfies the condition and further in a specific period in which the behavior of the aerial vehicle is excessively large or small in response to the piloting of the aerial vehicle, as compared with a period that is not the specific period.

5. An information processing apparatus comprising:
 a processor configured to:
 learn a relationship between piloting of an aerial vehicle and a behavior of the aerial vehicle in response to the piloting;
 determine whether a flight of the aerial vehicle is a flight that satisfies a condition determined as being not for the learning;
 perform the learning to generate a learning model with less weight given to a relationship between the piloting and the behavior of the aerial vehicle in a period in which it is determined that the flight satisfies the condition, as compared with a period in which it is determined that the flight does not satisfy the condition; and
 wherein the processor is further configured to:
 perform the learning to generate the learning model with less weight given to a relationship between the piloting and the behavior of the aerial vehicle in a period in which it is determined that the flight satisfies the condition and further in a specific period in which the behavior of the aerial vehicle differs from an expected behavior by a threshold value or more, as compared with a period that is not the specific period;
 wherein the threshold value varies according to the piloting skill level of an operator; and
 control the flight of the aerial vehicle with the generated learning model.

6. The information processing apparatus according to claim 1,
 wherein the processor is further configured to perform the learning to generate the learning model with less weight given to a relationship between the piloting and the behavior of the aerial vehicle in a period in which it is determined that the flight satisfies the condition and further in a specific period in which an external environment at the time of the flight of the aerial vehicle is a predetermined environment, as compared with a period that is not the specific period.

7. The information processing apparatus according to claim 6, wherein the predetermined environment is an environment where a gust blows onto the aerial vehicle and the aerial vehicle takes a sudden unintended behavior.

8. The information processing apparatus according to claim 6, wherein the predetermined environment is an environment where at least one of a strong wind is constantly blowing, rain is falling, or snow is falling.

* * * * *